(12) United States Patent
Tanaka

(10) Patent No.: US 7,866,900 B2
(45) Date of Patent: Jan. 11, 2011

(54) CAMERA CONTROL APPARATUS, SHOOTING DIRECTION CONTROL METHOD AND CAMERA APPARATUS

(75) Inventor: Mutsuo Tanaka, Hachiouji (JP)

(73) Assignee: Securion 24. Co. Ltd., Tokyo (JP)

( * ) Notice: Subject to any disclaimer, the term of this patent is extended or adjusted under 35 U.S.C. 154(b) by 0 days.

(21) Appl. No.: 12/554,184

(22) Filed: Sep. 4, 2009

(65) Prior Publication Data
US 2010/0310249 A1   Dec. 9, 2010

(30) Foreign Application Priority Data
Jun. 4, 2009   (JP)   ............................. 2009-135399

(51) Int. Cl.
*G03B 17/00* (2006.01)
*G03B 17/02* (2006.01)
(52) U.S. Cl. ...................................... 396/428; 396/535
(58) Field of Classification Search .................. 396/428
See application file for complete search history.

(56) References Cited

FOREIGN PATENT DOCUMENTS

| JP | 2008-079395 | | 4/2008 |
|---|---|---|---|
| KR | 10-2009-0011393 | * | 2/2009 |
| WO | WO 2009/145401 | * | 12/2009 |

* cited by examiner

*Primary Examiner*—Rodney E Fuller
(74) *Attorney, Agent, or Firm*—Ipusa, PLLC

(57) ABSTRACT

A camera control apparatus, includes two actuators, each including a piezoelectric body and a stick-shaped shaft provided on the piezoelectric body, the piezoelectric body being configured to be modified based on application of an AC voltage, a rotating part including two circular-shaped members rotatably provided, the circular-shaped members being configured to sandwich two of the shafts; an electric power source part configured to apply the AC voltage to the piezoelectric bodies; and a rotation control part configured to change a shooting direction of a camera apparatus directly connected to the circular-shaped members in rotational directions of the circular-shaped members based on the amount of rotation of the circular-shaped members.

15 Claims, 10 Drawing Sheets

CAMERA CONTROL APPARATUS, SHOOTING DIRECTION CONTROL METHOD AND CAMERA APPARATUS

CROSS-REFERENCE TO RELATED APPLICATIONS

This patent application is based upon and claims the benefit of priority of Japanese Patent Application No. 2009-135399 filed on Jun. 4, 2009 the entire contents of which are incorporated herein by reference.

BACKGROUND OF THE INVENTION

1. Field of the Invention

The present invention generally relates to techniques of controlling shooting directions of cameras. More specifically, the present invention relates to a camera control apparatus, a shooting direction control method, and a camera apparatus.

2. Description of the Related Art

A shooting direction of a camera apparatus such as a monitoring camera can be changed by remote control via wireless communication or wire communication (for example, a control line). The shooting direction of the camera apparatus is changed by changing a direction of the camera apparatus in a horizontal direction and a height direction. In order to change the direction of the camera apparatus, the camera apparatus includes a motor. A rotational force of the motor is transmitted to the camera apparatus via a gear or a driving belt. See, for example, Japanese Laid-Open Patent Application Publication No. 2008-079395.

However, according to the above-mentioned technique, when the shooting direction of the camera apparatus is controlled, the motor, the gear, the driving belt, and others are required. Due to the weights of the motor, the gear, the driving belt, and fixing members for the parts, the weight of the camera apparatus is large.

If the weight of the camera apparatus is large, components for providing the camera apparatus are large so that operations for providing the camera apparatus are complicated.

Furthermore, problems of driving sounds of the motor, the gear, and the driving belt and complex exchanging of these endurance components may occur.

In addition, when the motor is driven, electromagnetic waves are generated from the motor. Therefore, a place where the camera apparatus may be arranged is limited.

SUMMARY OF THE INVENTION

Accordingly, embodiments of the present invention may provide a novel and useful camera control apparatus, shooting direction control method and camera apparatus solving one or more of the problems discussed above.

More specifically, the embodiments of the present invention may provide a camera control apparatus whereby a motor, a gear, and a driving belt for controlling a shooting direction of a camera apparatus and fixing members for them are not required and smoothness of motion, light weight, and endurance are improved; and a shooting direction control method and the camera apparatus.

Another aspect of the present invention may be to provide a camera control apparatus, including:

two actuators, each including a piezoelectric body and a stick-shaped shaft provided on the piezoelectric body, the piezoelectric body being configured to be modified based on application of an AC voltage, a rotating part including two circular-shaped members rotatably provided, the circular-shaped members being configured to sandwich two of the shafts;

an electric power source part configured to apply the AC voltage to the piezoelectric bodies; and a rotation control part configured to change a shooting direction of a camera apparatus directly connected to the circular-shaped members in rotational directions of the circular-shaped members based on the amount of rotation of the circular-shaped members.

Another aspect of the present invention may be to provide a camera apparatus, including a camera control apparatus including two actuators, each including a piezoelectric body and a stick-shaped shaft provided on the piezoelectric body, the piezoelectric body being configured to be modified based on application of an AC voltage, a rotating part including two circular-shaped members rotatably provided, the circular-shaped members being configured to sandwich two of the shafts, an electric power source part configured to apply the AC voltage to the piezoelectric bodies and a rotation control part configured to change a shooting direction of the camera apparatus directly connected to the circular-shaped members in rotational directions of the circular-shaped members based on the amount of rotation of the circular-shaped members;

wherein a shooting direction of the camera apparatus is changed by control by the camera control apparatus.

Another aspect of the present invention may be to provide a shooting direction control method by a camera control apparatus, the camera control apparatus including two actuators, each including a piezoelectric body and a stick-shaped shaft provided on the piezoelectric body, the piezoelectric body being configured to be modified based on application of an AC voltage, a rotating part including two circular-shaped members rotatably provided, the circular-shaped members being configured to sandwich two of the shafts;

an electric power source part configured to apply the AC voltage to the piezoelectric bodies;

the shooting direction control method including:

a step of changing a shooting direction of a camera apparatus directly connected to the circular-shaped members in rotational directions of the circular-shaped members based on the amount of rotation of the circular-shaped members.

According to the embodiments of the present invention, it is possible to provide a camera control apparatus whereby a motor, a gear, and a driving belt for controlling a shooting direction of a camera apparatus and fixing members for them are not required and smoothness of motion, light weight, and endurance are improved. It is also possible to provide a shooting direction control method and the camera apparatus.

Additional objects and advantages of the embodiments are set forth in part in the description which follows, and in part will become obvious from the description, or may be learned by practice of the invention. The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

A description is given below, with reference to the FIG. 1 through FIG. 11 of embodiments of the present invention.

A structure of a camera apparatus 300 of the embodiment of the present invention is discussed with reference to FIG. 1. Here, FIG. 1 is a perspective view of the camera apparatus 300 of an embodiment of the present invention.

Figure 1:
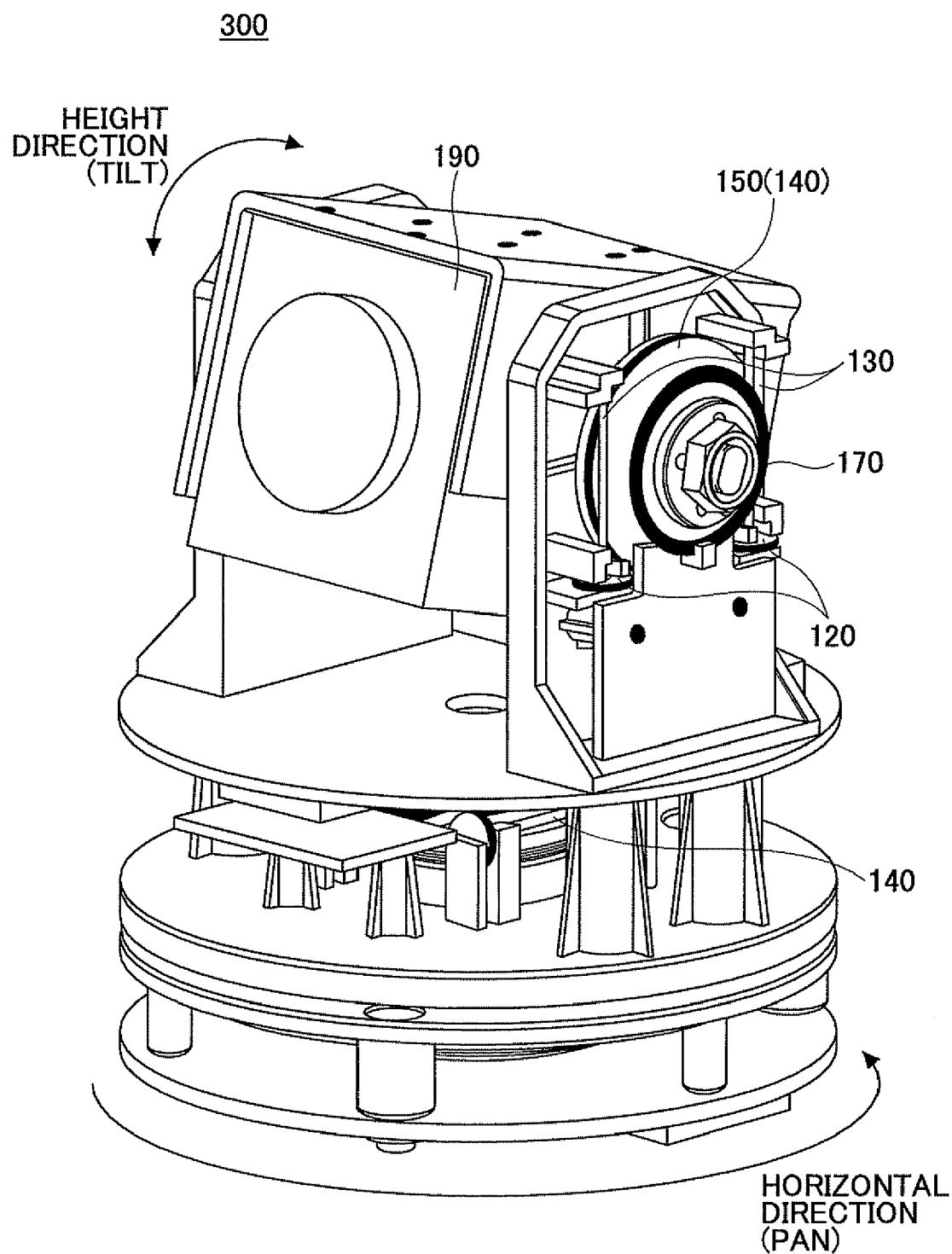
FIG. 1 is a perspective view of a camera apparatus of an embodiment of the present invention.

As shown in FIG. 1, the camera apparatus 300 includes a shooting part 190. The shooting part 190 is configured to shoot a subject. The shooting part 190 is rotated so that a shooting direction of the camera apparatus 300 is changed. In other words, the shooting direction of the camera apparatus 300 can be changed by changing directions of the shooting part 190 in a horizontal direction (pan) and a height direction (tilt).

Figure 2:
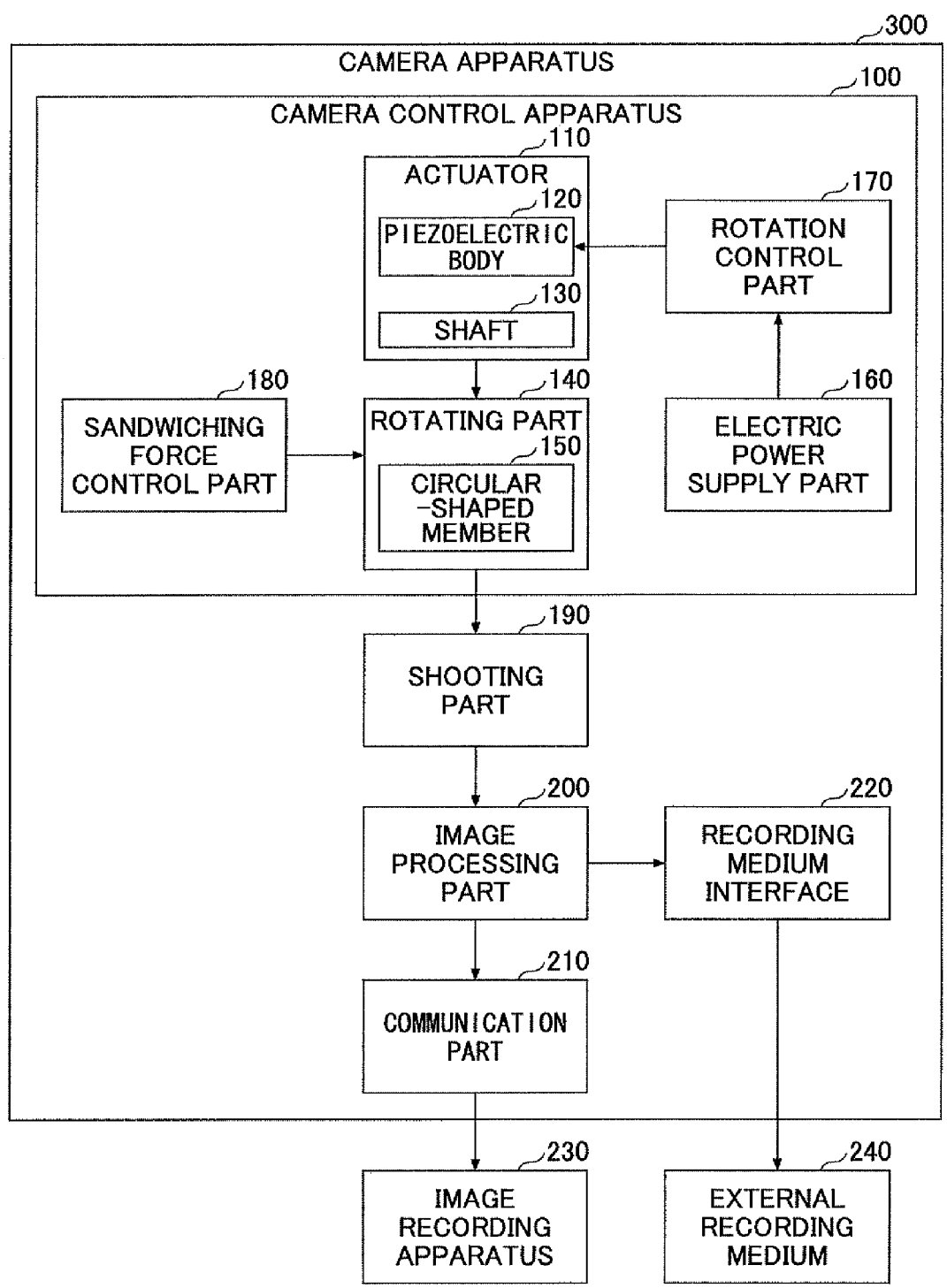
FIG. 2 is a block diagram of the camera apparatus of the embodiment of the present invention.

A camera control apparatus 100 (see FIG. 2) of the embodiment of the present invention rotates a circular-shaped member 150 by using an actuator 110 (see FIG. 2). In response to the rotation of the circular-shaped member 150, the shooting part 190 is rotated.

The camera apparatus 300 includes two camera control apparatuses 100 discussed above. One of the camera control apparatuses 100 corresponds to change in the horizontal direction. Another one of the camera control apparatuses 100 corresponds to change in the height direction. In other words, the shooting direction of the camera apparatus 300 can be changed by controlling the rotation of the circular-shaped members 150 provided in the camera control apparatuses 100.

(Operations of the Camera Apparatus 300)

Next, operations of the camera apparatus 300 of the embodiment of the present invention is discussed with reference to FIG. 2. Here, FIG. 2 is a block diagram of the camera apparatus 300 of the embodiment of the present invention.

Referring to FIG. 2, the camera apparatus 300 includes the camera control apparatus 100, the shooting part 190, an image processing part 200, a communication part 210, a recording medium interface 220, and other parts. The camera apparatus is connected to an image recording apparatus 230 via a wire communication circuit or a wireless communication circuit. The camera apparatus is connected to an external recording medium 240 via the recording medium interface 220.

The shooting part 190 is configured to obtain, by using a shooting device, image information of a subject from light generated by the subject or light reflected by the subject. The shooting device is, for example, a CCD (Charge Coupled Device) image sensor.

The image processing part 200 is configured to perform image processing, such as data compression, on the image information obtained by the shooting part 190 so that image information whose data size is smaller than that of original data is generated. The data compression is a process of compressing data of a dynamic image based on, for example, the MPEG (Moving Picture Experts Group)-2 standard, the MPEG-4 standard, or the H.264 standard. In addition, since the image processing part 200 is used for the compressing process of the image data, the image data are stored in a designated period for a while and are deleted in order of old data to new data.

The communication part 210 transmits compressed image information where data compressing is performed by the image processing part 200, to the image recording apparatus 230. The communication part 210 transmits the compressed image information to the image recording apparatus 230 via a wire communication circuit or a wireless communication circuit.

Here, the wire communication circuit is, for example, the Internet or a LAN (Local Area Network). The wireless communication circuit is, for example, communication by the Bluetooth (registered trademark) standard or communication by the Wi-Fi (registered trademark) standard. However, there is no limitation of communication standard.

In a case where the compressed image information is transmitted via the wireless communication circuit, it is not necessary to provide a video line and a control line so that construction for changing the place where the camera apparatus 300 is provided can be performed easily.

The recording medium interface 220 is an interface of the camera apparatus 300 and the external recording medium 240. The image processing part 220 records and stores the compressed image information in the external recording medium 240 via the recording medium interface 220. Here, the external recording medium 240 is a detachable recording medium such as an SD card or a USB memory.

The image recording apparatus 230 is configured to receive the compressed image information transmitted by the communication part 210. The image recording apparatus 230 records and stores the received compressed image information. In a case where the image recording apparatus 230 is a user terminal, the user terminal has application software whereby search, regeneration, editing, and others functions of the recorded or stored compressed image information are performed.

In the meantime, the camera apparatus 100 includes the actuator 110, a rotating part 140, an electric power supply part 160, a rotation control part 170, a sandwiching force control part 180, and other parts. The actuator 110 includes a piezoelectric body 120, a shaft 130, and other parts. The rotating part 140 includes the circular-shaped members 150.

Figure 3:
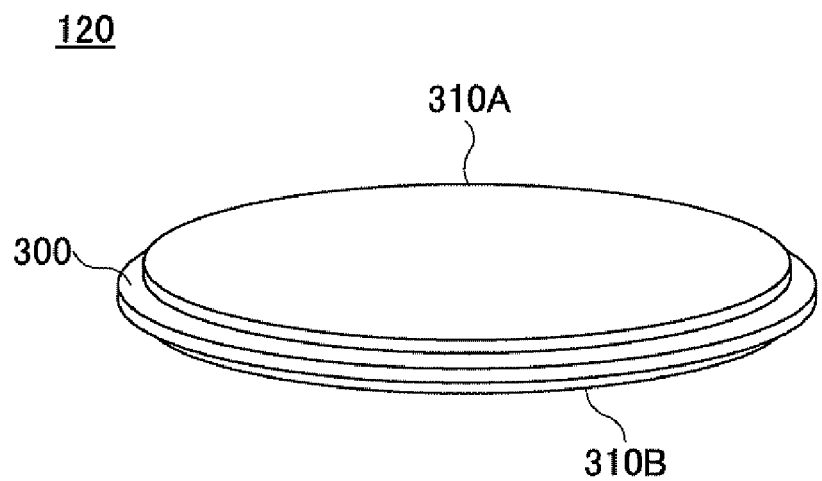
FIG. 3 is a first view for explaining operations of a piezoelectric body of the embodiment of the present invention.
Figure 4:
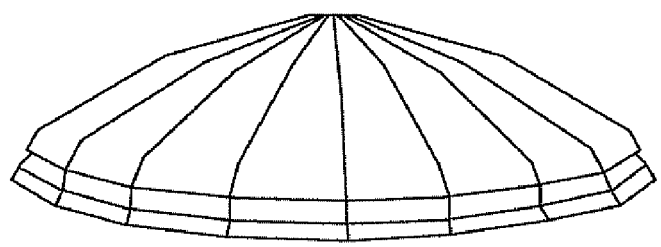
FIG. 4 is a second view for explaining the operations of the piezoelectric body of the embodiment of the present invention.

Here, the piezoelectric body 120 is discussed with reference to FIG. 3 and FIG. 4. FIG. 3 and FIG. 4 are first and second views for explaining operations of the piezoelectric body 120 of the embodiment of the present invention.

Referring to FIG. 3, the piezoelectric body 120 has a structure where an elastic member 300 is sandwiched by two piezoelectric ceramic members (piezoelectric members) 310A and 310B. The piezoelectric ceramic members 310A and 310B forming the piezoelectric body 120 may have a single layer or two or more layers. The elastic member 300 is sandwiched between the piezoelectric ceramic members 310A and 310B. The piezoelectric ceramic members 310A and 310B form an element for generating a modification (vibration) when a voltage is applied. The piezoelectric ceramic members 310A and 310B are, for example, ceramic members whose main ingredient is lead zirconate titanate (PZT). By sandwiching the elastic member 300 with the piezoelectric ceramic members 310A and 310B, a repulsive force of the piezoelectric body 120, namely a torque of the actuator 110 is increased. The elastic member 300 may be, for example, beryllium copper.

When the voltage is applied to the piezoelectric body 120 shown in FIG. 3, the piezoelectric body 120 is modified as shown in FIG. 4. Although the piezoelectric body 120 has a substantially circular-shaped plane configuration in the examples shown in FIG. 3 and FIG. 4, the piezoelectric body 120 may have a configuration other than the circular-shaped configuration, such as an elliptic-shaped configuration or a polygonal-shaped configuration.

Next, the actuator 110 is discussed with reference to FIG. 5. Here, FIG. 5 is a perspective view showing a structural example of the actuator 110 of the embodiment of the present invention.

Figure 5:
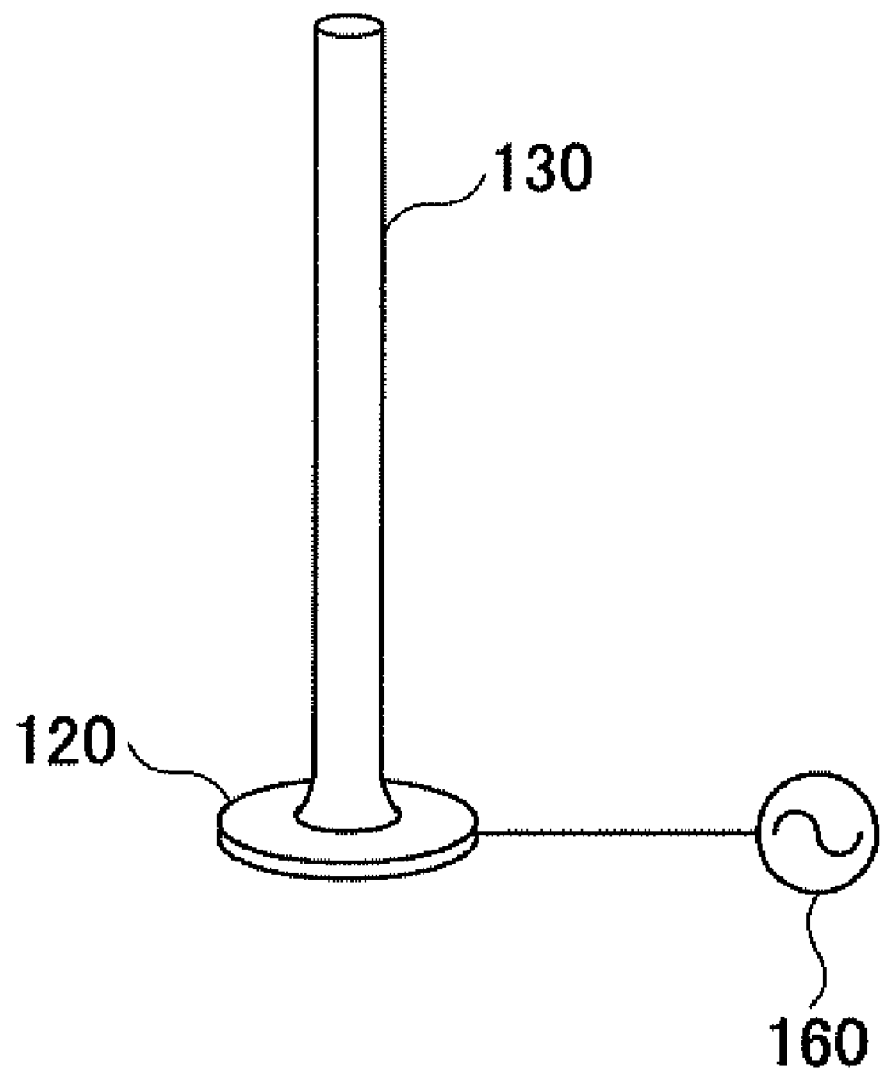
FIG. 5 is a perspective view showing a structural example of an actuator of the embodiment of the present invention.

As shown in FIG. 5, in the actuator 110, a stick-shaped shaft 130 is provided on the piezoelectric body 120 and the piezoelectric body 120 is connected to the electric power source 160. When the voltage is applied to the piezoelectric body 120, the piezoelectric body 120 is modified in shape as shown in FIG. 4. When application of the voltage to the piezoelectric body 120 is stopped, the piezoelectric body 120 assumes its original shape as shown in FIG. 3.

Accordingly, an AC voltage having a designated frequency is applied from the electric power source 160 to the piezoelectric body 120, and the piezoelectric body 120 is vibrated at the designated frequency so that the shaft 130 is also vibrated at the designated frequency.

In the meantime, the camera control apparatus 100 (see FIG. 2) includes two actuators 110 and the camera apparatus 300 (see FIG. 2) includes two camera control apparatuses 100 as discussed above. Therefore, the camera apparatus 300 includes four actuators 110.

Figure 6:
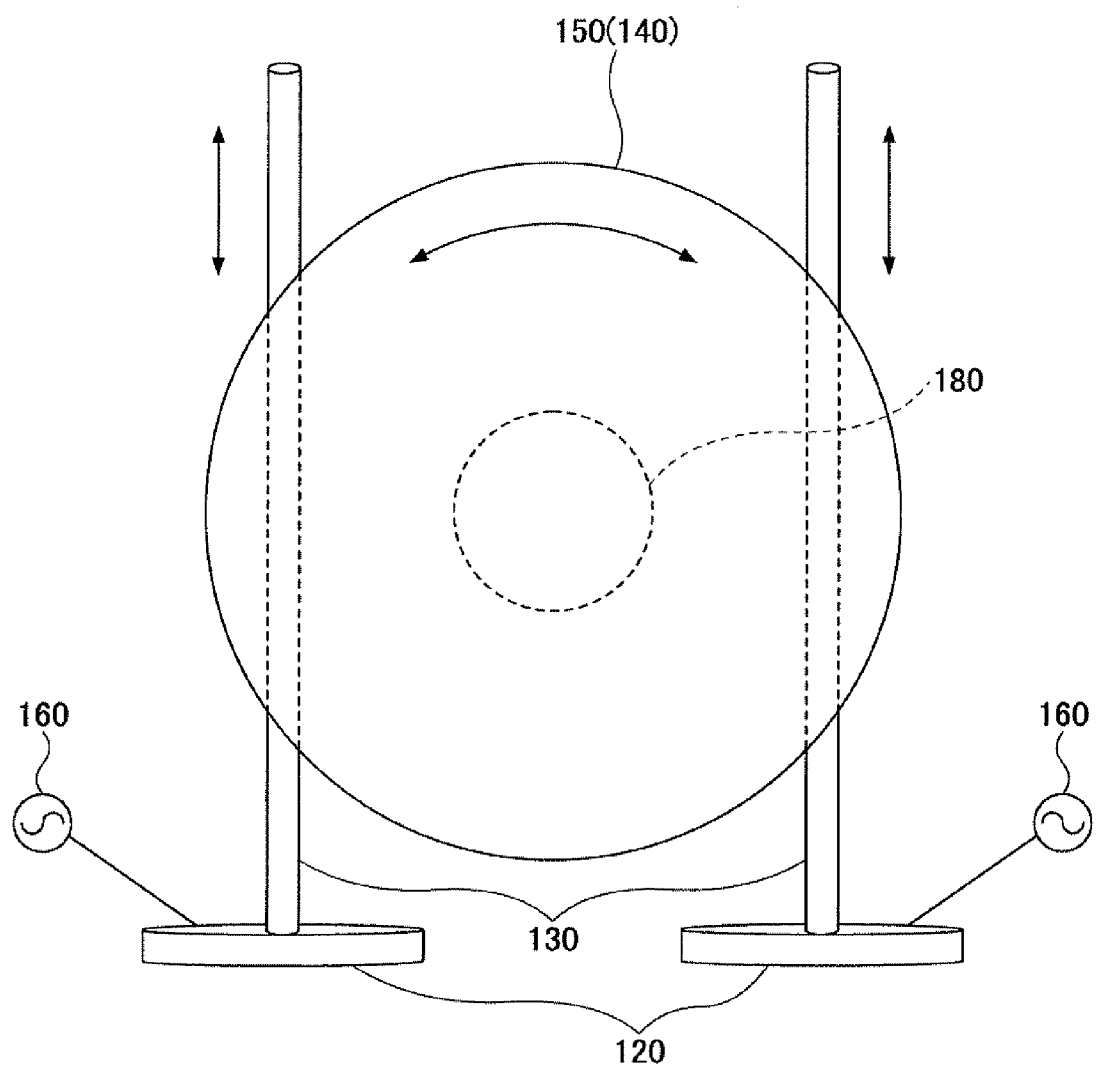
FIG. 6 is a front view showing a structural example of a rotating part of the embodiment of the present invention.
Figure 7:
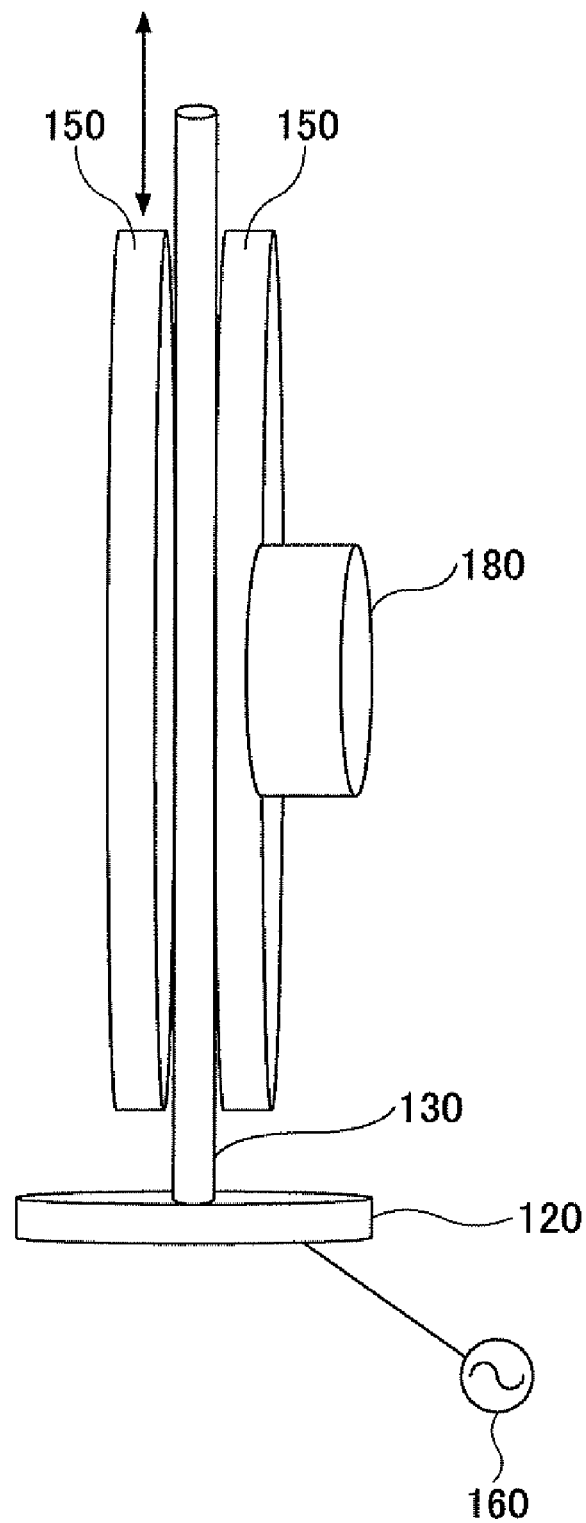
FIG. 7 is a side view showing the structural example of the rotating part of the embodiment of the present invention.

Next, the rotating part 140 is discussed with reference to FIG. 6 and FIG. 7. FIG. 6 is a front view showing a structural example of the rotating part 140 of the embodiment of the present invention. FIG. 7 is a side view showing the structural example of the rotating part 140 of the embodiment of the present invention.

The rotating part 140 includes two of the circular-shaped members 150. Two of the shafts 130 are sandwiched by these circular-shaped members 150. As shown in FIG. 6, the two shafts 130 are provided in parallel so as to be arranged along a tangential direction of external circumferences of the circular-shaped members 150 and in a symmetrical manner with respect to centers of the circular-shaped members 150. A view seen from a side of the shafts 130 and the circular-shaped members 150 is illustrated in FIG. 7.

A force for sandwiching the shafts 130 by the circular-shaped members 150 is controlled by the sandwiching force control part 180. The sandwiching force control part 180 is, for example, as shown in FIG. 6 and FIG. 7, a screw-type member situated in the centers of the circular-shaped members 150. By rotating this member, the force for sandwiching the shafts 130 by the circular-shaped members 150 can be controlled.

Next, the rotation of the circular-shaped members 150 of the rotating part 140 is discussed. When the voltage is applied to the piezoelectric body 120, the piezoelectric body 120 is modified so that the shaft 130 is also modified. When the force for sandwiching the shafts 130 by the circular-shaped members 150 is properly controlled, the circular-shaped members 150 are rotated in a direction where the shafts 130 are modified due to a friction force between the shafts 130 and the circular-shaped members 150.

If the shafts 130 return to original positions, the circular-shaped members 150 do not return to original positions with the shafts 130 so as to stay in the present positions. This occurs when inertial forces of the circular-shaped members 150 are greater than friction forces between the shafts 130 and the circular-shaped members 150.

In other words, the force for sandwiching the shafts 130 by the circular-shaped members 150 is controlled by the sandwiching force control part 180 so that the inertial forces of the circular-shaped members 150 and the friction forces between the shafts 130 and the circular-shaped members 150 have the above-mentioned relationship.

As discussed above, when the AC voltage having the designated frequency is applied from the electric power source 160 to one of the piezoelectric bodies 120, the corresponding shaft 130 is vibrated at the designated frequency so that the circular-shaped members 150 are rotated in a direction in which the shaft 130 is modified.

Since the rotating part 140 is configured to sandwich two of the shafts 130, by applying the AC voltage to either piezoelectric body 120, the corresponding shaft 130 can be vibrated so that the circular-shaped member 150 can be rotated in either direction.

The amount of rotation of the circular-shaped member 150 can be controlled based on a time period during which the AC voltage is applied to the piezoelectric body 120. In other words, in a case where the rotational amount of the circular-shaped member 150 is expected to be large, the time period during which the AC voltage is applied is made long. In a case where the rotational amount of the circular-shaped member 150 is expected to be small, the time period during which the AC voltage is applied is made short.

In addition, the rotational amount of the circular-shaped member 150 can be controlled based on the frequency of the applied AC voltage. For example, in a case where the circular-shaped member 150 is expected to be rotated at high speed, an AC voltage having a relatively high frequency such as, for example, approximately 33 kHz through approximately 45 kHz is applied. In a case where the circular-shaped member 150 is expected to be rotated at low speed, an AC voltage having a relatively low frequency such as, for example, approximately 25 kHz is applied.

Figure 8:
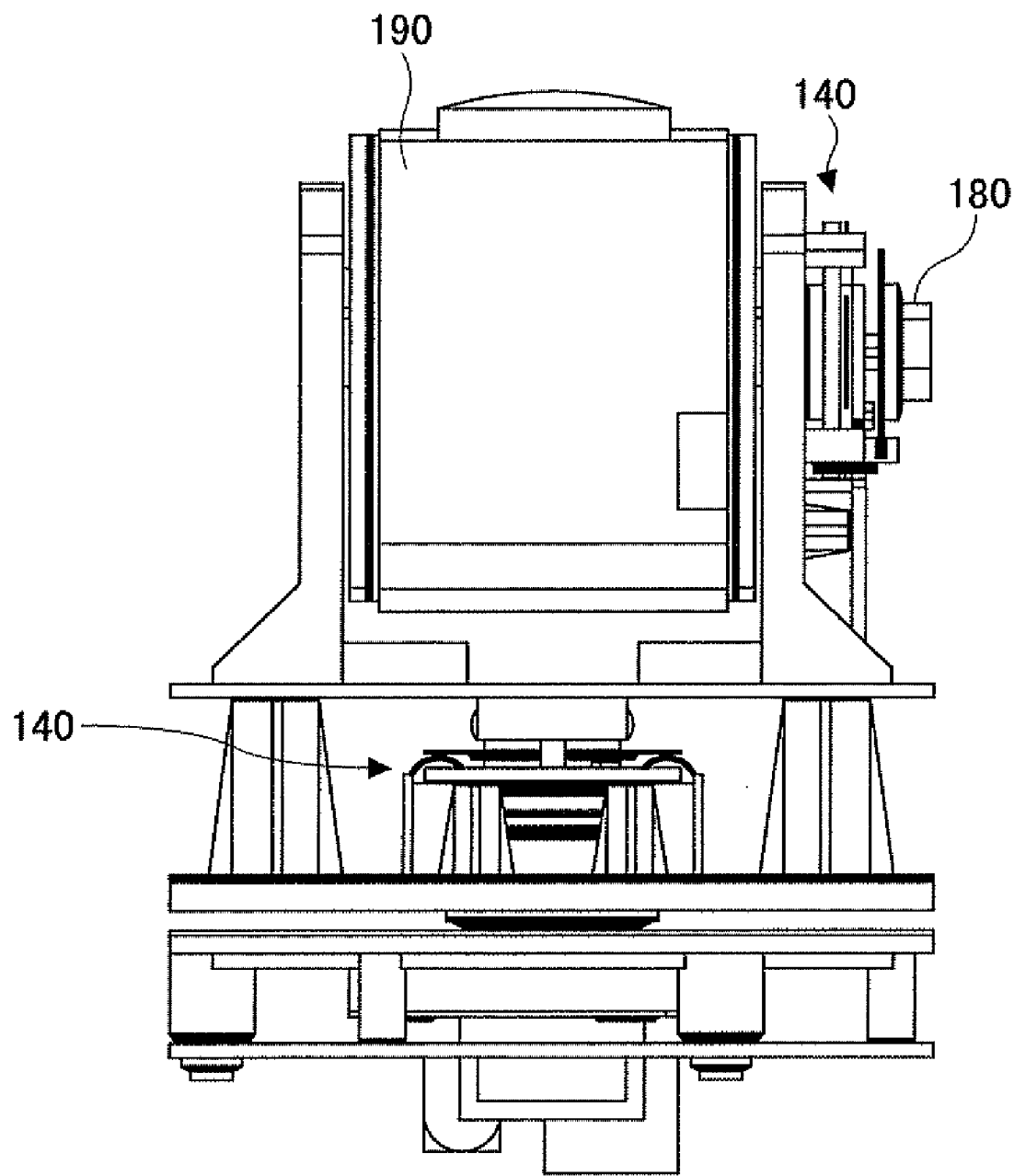
FIG. 8 is a view for explaining operations of the rotating part of the embodiment of the present invention.

FIG. 8 is a view for explaining operations of the rotating part 140 of the embodiment of the present invention. As shown in FIG. 8, one of the circular-shaped members 150 of the rotating part 140 is directly connected to the shooting part 190, not via a gear or driving belt. One of the rotating parts 140 is provided in a position so that the shooting part 190 is rotated in a horizontal direction. Another of the rotating parts 140 is provided in another position so that the shooting part 190 is rotated in a height direction.

Accordingly, the shooting part 190 is rotated in corresponding directions by the amounts of the rotation of the rotating members 150 of the rotating parts 140. The shooting direction of the shooting part 190 is controlled based on the elapsed time and the frequency of the AC voltages applied to the corresponding actuators 110 (piezoelectric bodies 120).

Figure 9:
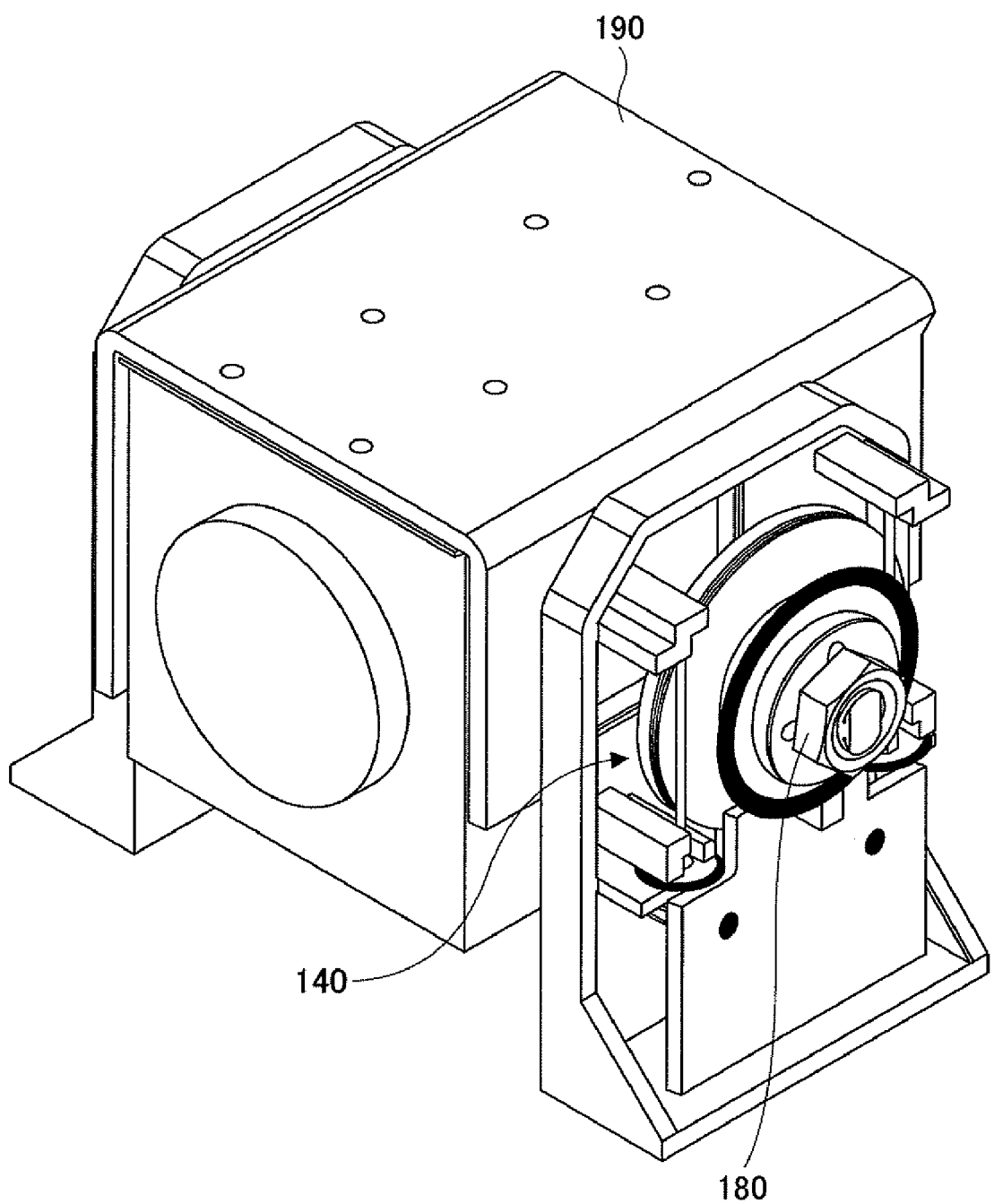
FIG. 9 is a view for explaining of rotation in a height direction of the rotating part of the embodiment of the present invention.
Figure 10:
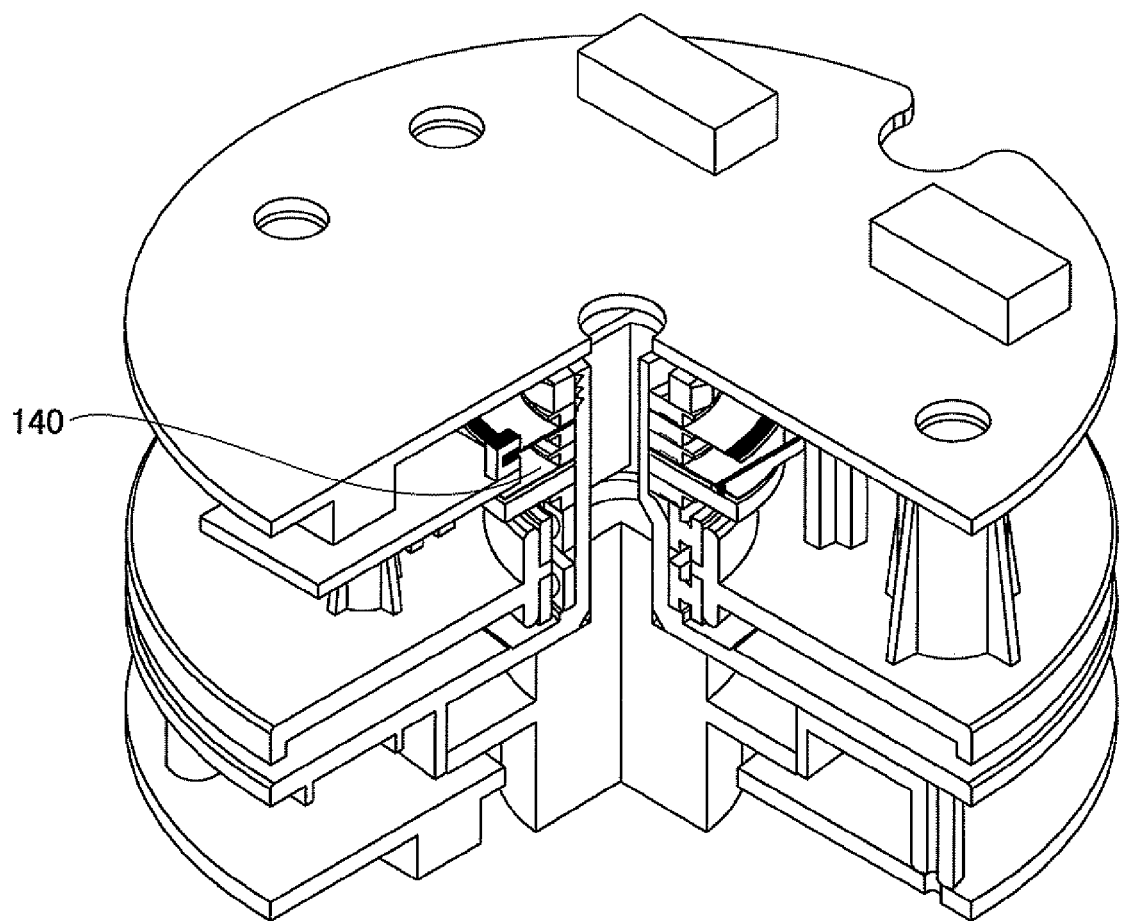
FIG. 10 is a view for explaining of rotation in a horizontal direction of the rotating part of the embodiment of the present invention.

FIG. 9 shows the rotating part 140 (circular-shaped members 150) configured to rotate the shooting part 190 in the height (tilt) direction. FIG. 10 shows the rotating part 140 (circular-shaped members 150) configured to rotate the shooting part 190 in the horizontal (pan) direction.

(Process Example of the Camera Apparatus 300)

Figure 11:
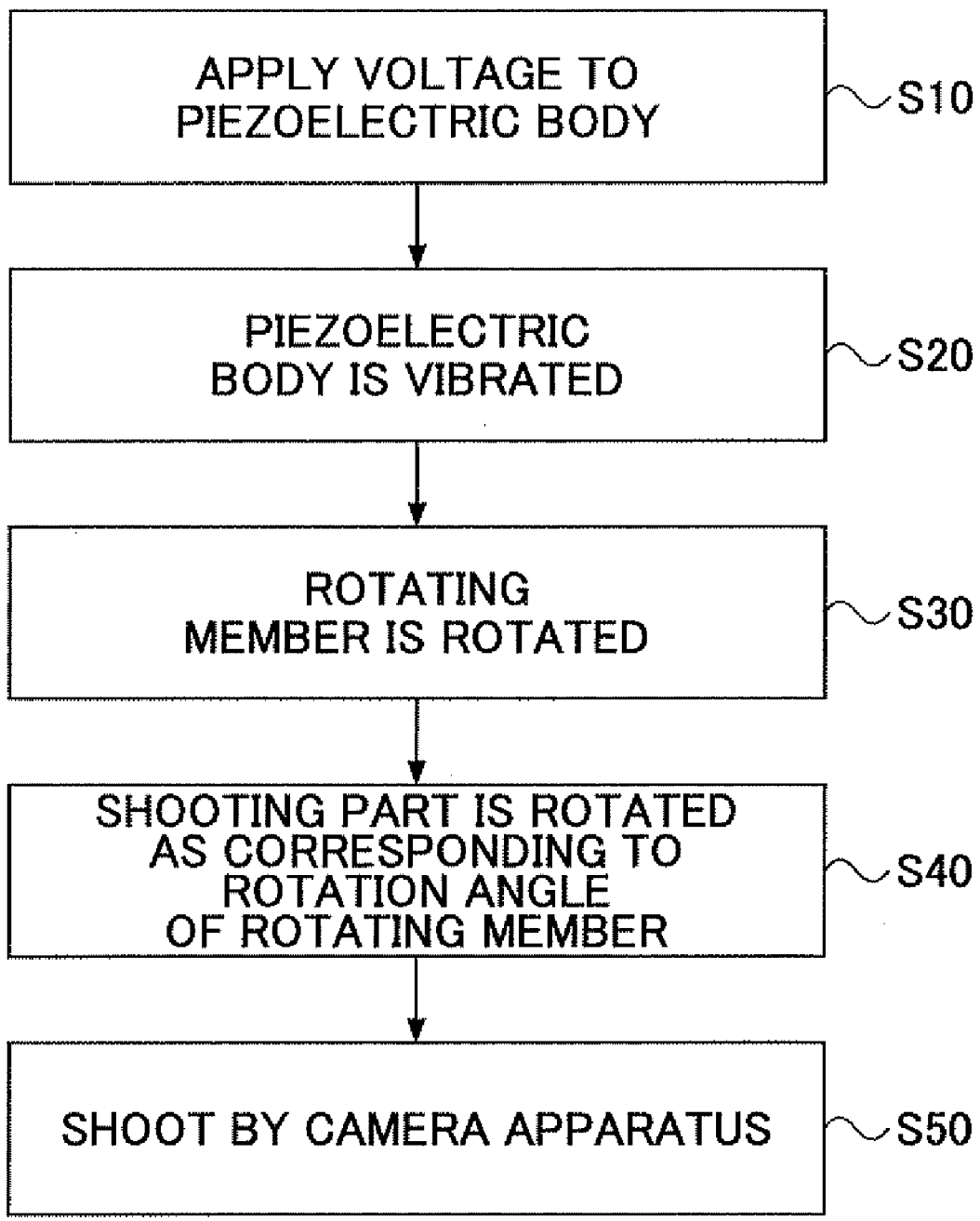
FIG. 11 is a flowchart of a process example of the camera apparatus of the embodiment of the present invention.

A process example of the camera apparatus 300 of the embodiment of the present invention is discussed with reference to FIG. 11. Here, FIG. 11 is a flowchart of a process whereby the subject is shot after the shooting direction of the camera apparatus 300 is changed so that the shot image information is transmitted to the image recording apparatus 230.

In step S10, the rotation control part 170 applies the AC voltages having the designated frequencies to the piezoelectric bodies 120 based on instructions from a user or a designated program. Here, as the piezoelectric bodies 120 where the AC voltages are applied, based on the above-mentioned instructions, one actuator is selected from the actuators 110 configured to rotate the shooting part 190 in the horizontal direction and one actuator is selected from the actuators 110 configured to rotate the shooting part 190 in the height direction.

While the amounts of the applied voltages are determined in advance (for example, approximately 25 V), the frequencies or applied time periods of the applied voltages are determined based on the above-mentioned instructions. In other words, based on the above-mentioned instructions, for example, a high speed control mode or a low speed control mode is selected as the rotational speed of the shooting part 190 and a time period based on an instruction or a time period set in advance is selected as the rotational time period of the shooting part 190.

In step S20, the piezoelectric bodies 120 are vibrated at a lower frequency based on application of the AC voltage and the shafts 130 provided on the piezoelectric bodies 120 are also vibrated.

In step S30, the circular-shaped members 150 of the rotating members 140 are rotated based on the vibrations of the shafts 130.

In step S40, the shooting part 190 is rotated in the horizontal and height directions based on the rotations of the circular-shaped members 150 so that the shooting direction of the shooting part 190 is changed.

In step S50, the shooting part 190 obtains, by using a shooting device, image information of a subject from light generated by the subject or light reflected by the subject. The image processing part 200 performs image processing such as data compression on the image information obtained by the shooting part 190 so as to generate image information whose data size is smaller than that of the original data.

Next, the communication part 210 transmits the compressed image information where data compression is performed by the image processing part 200, to the image recording apparatus 230. The image recording apparatus 230 receives, records and stores the compressed image information transmitted from the communication part 210. The image processing part 200 may record and store the compressed image information in the external recording medium 240 such as an SD card or a USB memory via the recording medium interface 220.

As discussed above, according to the camera apparatus 300 having the camera control apparatuses 100 of the embodiment of the present invention, components or members such as a motor, a gear and a driving belt are not required for controlling the shooting direction of the camera apparatus 300. Hence, it is possible to make the camera apparatus 300 light-weight.

In addition, since it is possible to make the camera apparatus 300 light-weight, it is possible to reduce work loads of operations for attaching or detaching the camera apparatus 300.

Furthermore, the camera apparatus 300 does not require a motor for controlling the shooting direction of the camera apparatus 300. Hence, for example, electromagnetic waves are not generated so that there is no limitation of the place where the camera apparatus 300 is provided and the camera apparatus 300 can be used in the vicinity of medical equipment, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A camera control apparatus, comprising:
   two actuators, each including a piezoelectric body and a stick-shaped shaft provided on the piezoelectric body, the piezoelectric body being configured to be modified based on application of an AC voltage,
   a rotating part including two circular-shaped members rotatably provided, the circular-shaped members being configured to sandwich two of the shafts;
   a sandwich force controlling part configured to control a force for sandwiching the two shafts;
   an electric power source part configured to apply the AC voltage to the piezoelectric bodies; and
   a rotation control part configured to change a shooting direction of the camera apparatus directly connected to the circular-shaped members in rotational directions of the circular-shaped members based on the amount of rotation of the circular-shaped members.

2. The camera control apparatus as claimed in claim 1, wherein the two shafts are sandwiched by
   the circular-shaped members, the two shafts being provided in parallel so as to be arranged along a tangential direction of external circumferences of the circular-shaped members in a symmetrical manner with respect to centers of the circular-shaped members.

3. The camera control apparatus as claimed in claim 1, wherein the piezoelectric body includes a plurality of piezoelectric members;
   an elastic member is sandwiched by the piezoelectric members; and
   the same AC voltage is applied to the piezoelectric members from the electric power source part.

4. The camera control apparatus as claimed in claim 1, wherein a rotational angle of the circular-shaped members is controlled by the rotation control part, based on a frequency of the AC voltage and a time period during which the AC voltage is applied.

5. A camera apparatus, comprising:
a camera control apparatus including two actuators, each including a piezoelectric body and a stick-shaped shaft provided on the piezoelectric body, the piezoelectric body being configured to be modified based on application of an AC voltage,
a rotating part including two circular-shaped members rotatably provided, the circular-shaped members being configured to sandwich two of the shafts,
a sandwich force controlling part configured to control a force for sandwiching the two shafts;
an electric power source part configured to apply the AC voltage to the piezoelectric bodies and
a rotation control part configured to change a shooting direction of the camera apparatus directly connected to the circular-shaped members in rotational directions of the circular-shaped members based on the amount of rotation of the circular-shaped members;
wherein a shooting direction of the camera apparatus is changed by control by the camera control apparatus.

6. A shooting direction control method by a camera control apparatus, the camera control apparatus including two actuators, each including a piezoelectric body and a stick-shaped shaft provided on the piezoelectric body, the piezoelectric body being configured to be modified based on application of an AC voltage,
a rotating part including two circular-shaped members rotatably provided, the circular-shaped members being configured to sandwich two of the shafts;
controlling a force used in sandwiching the two shafts;
an electric power source part configured to apply the AC voltage to the piezoelectric bodies; the shooting direction control method comprising:
a step of changing a shooting direction of a camera apparatus directly connected to the circular-shaped members in rotational directions of the circular-shaped members based on the amount of rotation of the circular-shaped members.

7. The shooting direction control method as claimed in claim 6, further comprising:
sandwiching the two shafts by the circular-shaped members,
providing the two shafts in parallel so as to be arranged along a tangential direction of external circumferences of the circular-shaped members in a symmetrical manner with respect to centers of the circular-shaped members.

8. The shooting direction control as claimed in claim 6, further comprising:
controlling a force for sandwiching the two shafts.

9. The shooting direction control method as claimed in claim 6, further comprising:
wherein the piezoelectric body includes a plurality of piezoelectric members;
sandwiching an elastic member by the piezoelectric members; and
applying the same voltage to the piezoelectric members from the electric power source part.

10. The shooting direction control method as claimed in claim 9, further comprising:
when a voltage is applied, the piezoelectric ceramic members forms an element for generating a modification.

11. The shooting direction control method as claimed in claim 10, further comprising:
sandwiching the elastic member with the piezoelectric ceramic members, thereby increasing a repulsive force of the piezoelectric body.

12. The shooting direction control method as claimed in claim 6, further comprising:
controlling a rotational angle of the circular-shaped members based on a frequency of the AC voltage and a time period during which the AC voltage is applied.

13. The shooting direction control method as claimed in claim 6, further comprising:
when inertial forces of the circular-shaped members are greater than friction forces between the shafts and the circular-shaped members, the circular-shaped members avoid returning to original positions with the shafts.

14. The shooting direction control method as claimed in claim 6, further comprising:
applying the AC voltage to either of the piezoelectric bodies to vibrate the corresponding shaft so that the circular-shaped member is rotated in a plurality of directions.

15. The shooting direction control method as claimed in claim 6, further comprising:
operating the camera apparatus without a motor for controlling the shooting direction.

* * * * *